United States Patent
Gail et al.

(10) Patent No.: US 9,465,791 B2
(45) Date of Patent: Oct. 11, 2016

(54) METHOD AND APPARATUS FOR AUTOMATIC DETECTION OF SPELLING ERRORS IN ONE OR MORE DOCUMENTS

(75) Inventors: H. Richard Gail, Ossining, NY (US); Sidney L. Hantler, Cortland Manor, NY (US); Meir M. Laker, Spring Valley, NY (US); Jonathan Lenchner, North Salem, NY (US); Daniel Milch, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1833 days.

(21) Appl. No.: 11/673,173

(22) Filed: Feb. 9, 2007

(65) Prior Publication Data

US 2008/0195940 A1 Aug. 14, 2008

(51) Int. Cl.
  *G06F 17/27* (2006.01)
(52) U.S. Cl.
  CPC ......... *G06F 17/2735* (2013.01); *G06F 17/273* (2013.01)
(58) Field of Classification Search
  CPC ............................ G06F 17/273; G06F 17/2735
  USPC .............................................. 715/257; 704/10
  See application file for complete search history.

(56) References Cited

U.S. PATENT DOCUMENTS

| 7,503,000 | B1* | 3/2009 | Kreulen et al. | 715/259 |
|---|---|---|---|---|
| 2002/0099536 | A1* | 7/2002 | Bordner et al. | 704/10 |
| 2004/0002994 | A1* | 1/2004 | Brill et al. | 707/104.1 |
| 2004/0210434 | A1* | 10/2004 | Wang et al. | 704/9 |
| 2005/0075876 | A1* | 4/2005 | Tsuruta | 704/251 |
| 2005/0251744 | A1* | 11/2005 | Brill et al. | 715/533 |
| 2006/0206313 | A1* | 9/2006 | Xu et al. | 704/10 |

OTHER PUBLICATIONS

Cucerzan, Silviu et al. "Spelling correction as an iterative process that exploits the collective knowledge of web users". 2004 Microsoft Research.*
Tsuruoka, Yoshimasa et al. "Boosting Precision and Recall of Dictionary-Based Protein Name Recognition". 2003 Association for Computing Machinery.*
van Delden, Sebastian et al. "Supervised and Unsupervised Automatic Spelling Correction Algorithms". 2004 IEEE.*
Wilbur, W. John et al. "Spelling correction in the PubMed search engine". Sep. 1, 2006, Springer Netherlands.*

* cited by examiner

*Primary Examiner* — Cesar Paula
*Assistant Examiner* — Tyler J Schallhorn
(74) *Attorney, Agent, or Firm* — Ryan, Mason & Lewis, LLP

(57) ABSTRACT

Methods and apparatus are provided for automatically detecting spelling errors in one or more documents, such as documents being processed for the creation of a lexicon According to one aspect of the invention, a spelling error is detected in one or more documents by determining if at least one given word in the one or more documents satisfies a predefined misspelling criteria, wherein the predefined misspelling criteria comprises the at least one given word having a frequency below a predefined low threshold and the at least one given word being within a predefined edit distance of one or more other words in the one or more documents having a frequency above a predefined high threshold; and identifying a given word as a potentially misspelled word if the given word satisfies the predefined misspelling criteria.

25 Claims, 4 Drawing Sheets

METHOD AND APPARATUS FOR AUTOMATIC DETECTION OF SPELLING ERRORS IN ONE OR MORE DOCUMENTS

FIELD OF THE INVENTION

The present invention relates generally to techniques for real-time spelling correction of words in documents and more particularly, to techniques for automatically detecting spelling errors in one or more documents, for example, during the creation of a lexicon comprised of words from the documents

BACKGROUND OF THE INVENTION

A number of techniques exist for creating a lexicon by compiling words from a number of documents, such as the Internet. A significant problem with such techniques, however, is that the source documents often contain a number of errors that are introduced into the lexicon, which is desired to be error-free Thus, it is desired to remove such errors from the lexicon being created.

A number of techniques exist for automatically detecting spelling errors Suppose that a spell checking algorithm is given a word, G, such as a possibly misspelled word, and attempts to find one or more other words from a list of candidate words (such as validly spelled words) that are within a given edit distance from G. The edit distance between two words is the smallest number of fundamental operations that transform the candidate word into the given word (with each fundamental operation, for example, consisting of removing one letter (deletion), adding one letter (insertion), replacing one letter with another letter (replacement), or transposing two letters (transposition))

Two words are said to have a distance (or "edit distance") of zero between them if they are identical. Given the above definition of "fundamental operation" the two words are said have a distance one separation if one can get from one word to the other word, by: (1) transposing one pair of adjacent characters; (2) replacing a single character with any other character; (3) deleting any one character; or (4) inserting an arbitrary character at any position in the original word. Likewise, words are a distance two apart if two operations of the type described above are required to get from the first word to the second word More generally, two words are a distance N apart if N operations are required to get from the first word to the second.

Word processors typically perform spelling correction using a lexicon that is not derived from a user's collection of documents. Thus, when a user starts using a word processor, and encounters words that are not found in the provided lexicon, such as company acronyms and product names, the unfound words are initially flagged as misspellings (until, and if, the user adds the words to his or her personal lexicon) If, however, the lexicon were instead created by sifting through the existing documents of the user, or a work group associated with the user, this effort could be saved.

Nonetheless, the documents of the user or work group would typically contain a number of errors that should not be included in the lexicon. A need therefore exists for improved techniques for automatically detecting spelling errors in one or more documents

SUMMARY OF THE INVENTION

Generally, methods and apparatus are provided for automatically detecting spelling errors in one or more documents, such as documents being processed for the creation of a lexicon. According to one aspect of the invention, a spelling error is detected in one or more documents by determining if at least one given word in the one or more documents satisfies a predefined misspelling criteria, wherein the predefined misspelling criteria comprises the at least one given word having a frequency below a predefined low threshold and the at least one given word being within a predefined edit distance of one or more other words in the one or more documents having a frequency above a predefined high threshold; and identifying a given word as a potentially misspelled word if the given word satisfies the predefined misspelling criteria According to a further aspect of the invention, a dictionary (i e., a lexicon) of correctly spelled words is created from the documents Generally, a list of all words appearing in the documents is assembled, a frequency of occurrence of each of the words in the one or more documents is determined and then words aye flagged as potentially misspelled words that are a short distance from a commonly occurring word, but which themselves appear in extraordinarily few documents. The lexicon can optionally "learn" by observing human users of the lexicon that a given word that was mistakenly left out of the lexicon using the aforesaid heuristic should in fact have been left in According to another aspect of the invention, the documents that are processed comprise documents being processed by at least one user, and a word count is maintained for each word in the one or more documents The word frequencies that are employed in the predefined misspelling criteria are based on these word counts If a given word satisfies the predefined misspelling criteria, then a correction of the given word can optionally be suggested using the word within the predefined edit distance and having a frequency above the predefined high threshold. In one variation, a count of the total words in the one or more documents is maintained and the correction is suggested only if the total word count satisfies a predefined criteria.

A more complete understanding of the present invention, as well as further features and advantages of the present invention, will be obtained by reference to the following detailed description and drawings.

DETAILED DESCRIPTION OF PREFERRED EMBODIMENTS

Figure 1:
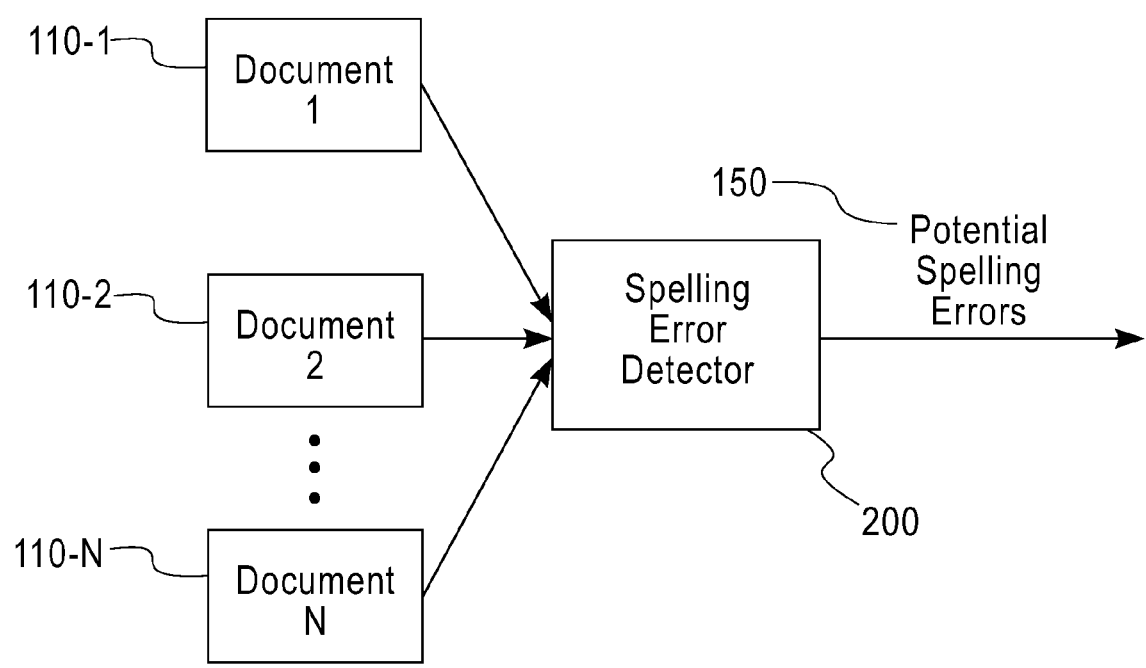
FIG. 1 illustrates a spelling error detector incorporating features of the present invention.

The present invention provides techniques for automatically detecting spelling errors in one or more documents, such as documents being processed for the creation of a lexicon The invention applies primarily to collections of documents in one or more western languages, though it is also possible to apply the invention to any language where there is a notion of distance between words, as would be apparent to a person or ordinary skill in the art In one embodiment, distance between words is defined using a notion of "edit distance" See, for example, Maxime Crochemore and Wojciech Rytter, Text Algorithms, Oxford University Press, New York (1994) Generally, two words are of distance one from each other if one can obtain one word from the other, either (1) by transposing adjacent characters, (2) by deleting a character, (3) by inserting a character, or (4) by replacing a character with another character A word is then of distance N from another word, if the first word can be transformed into the second word via a sequence of N steps, as described above. Other definitions of edit distance, or more generally distance, between words are possible Thus the invention applies not only to collections of documents in conventional languages, but also to scientific databases containing proteins described by their nucleotide sequences and any other collection of entities that my be construed as documents containing words where the similarity between words may be described in terms of the similarity of the "letters" comprising the words.

The present invention recognizes that words that are a short edit distance from a commonly occurring word, but which themselves appear in few documents are likely to be misspellings. According to one aspect of the invention, a spelling error in one or more documents is detected by determining if a given word in the one or more documents satisfies a predefined misspelling criteria The predefined misspelling criteria comprises the given word having a frequency below a predefined low threshold and the given word being within a predefined edit distance of one or more other words in the one or more documents having a frequency above a predefined high threshold A given word is identified as a potentially misspelled word if the given word satisfies the predefined misspelling criteria In one exemplary implementation, the invention creates a dictionary (i e, a lexicon) of correctly spelled words the created lexicon can be employed, for example, where a standard reference lexicon is not available, but instead a collection of documents is available containing a presumed universe of possible words, though conceivably with misspellings Generally, a list of all words appearing in the documents is assembled and then words are removed that are a short distance from a commonly occurring word, but which themselves appear in extraordinarily few documents. The lexicon can optionally "learn" by observing human users of the lexicon that a given word that was mistakenly left out of the lexicon using the aforesaid heuristic should in fact have been left in.

In another exemplary implementation of the invention, one or more documents that are processed comprise documents being processed by at least one user, and wherein the method further comprises the step of maintaining a word count for each word in the one or more documents. The word frequencies that are employed in the predefined misspelling criteria are based on these word counts. If a given word satisfies the predefined misspelling criteria, then a correction of the given word can optionally be suggested using the word within the predefined edit distance and having a frequency above the predefined high threshold.

FIG. 1 illustrates a spelling error detector 200 incorporating features of the present invention. The spelling error detector 200 is discussed further below in conjunction with FIG. 2. As shown in FIG. 1, the spelling error detector 200 processes one or more documents 110-1 through 110-N (hereinafter, collectively referred to as documents 110). As previously indicated, the spelling error detector 200 detects a spelling error in the one or more documents 110 by determining if a given word in the one or more documents 110 satisfies a predefined misspelling criteria The predefined misspelling criteria comprises the given word having a frequency below a predefined low threshold and the given word being within a predefined edit distance of one or more other words in the one or more documents having a frequency above a predefined high threshold. A given word is identified as a potentially misspelled word 150 if the given word satisfies the predefined misspelling criteria.

Figure 2:
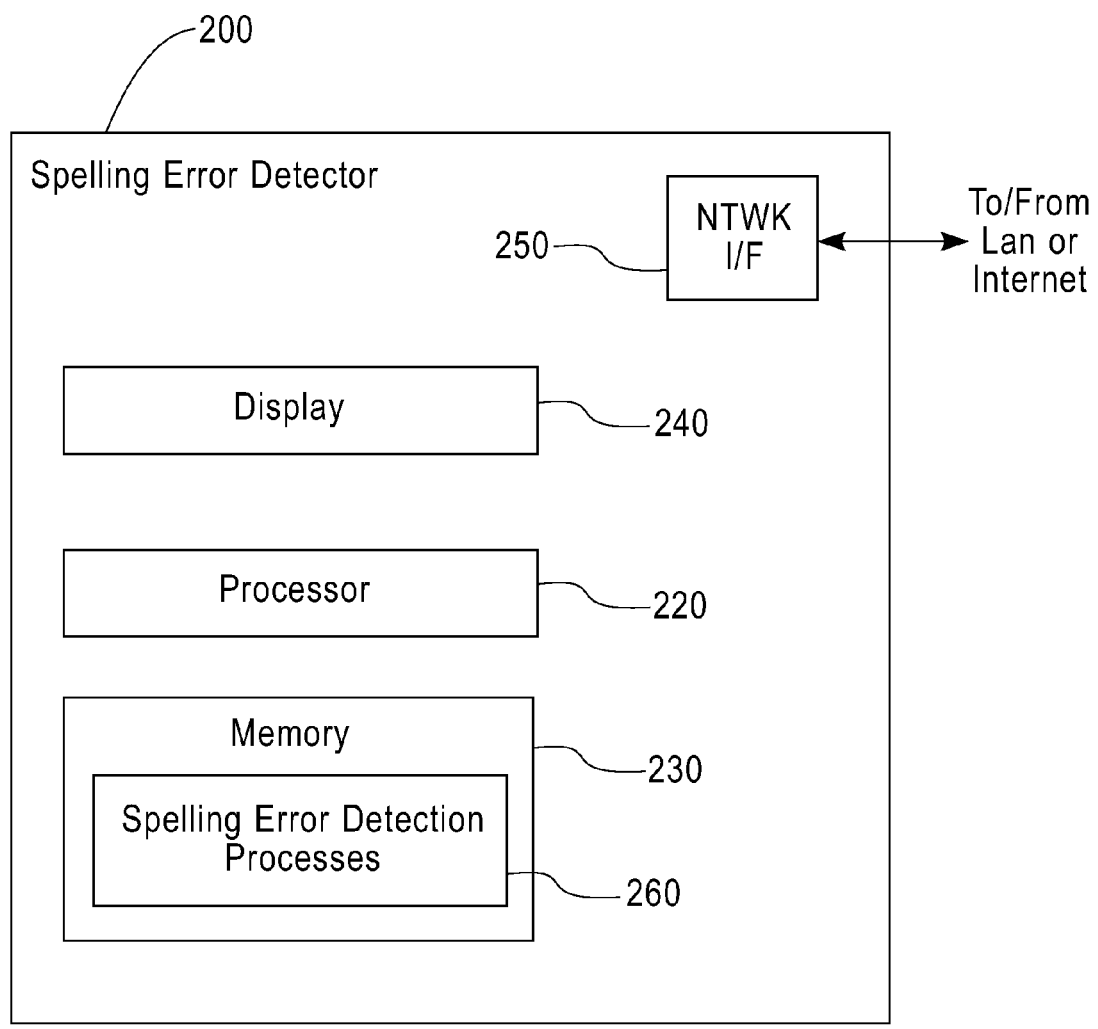
FIG. 2 is a block diagram of an exemplary spelling error detector that can implement the processes of the present invention.

FIG. 2 is a block diagram of an exemplary spelling error detector 200 that can implement the processes of the present invention. The computing device 200 may be embodied as any computing device including, for example, a workstation or desktop computer. As shown in FIG. 2, a memory 230 configures the processor 220 to implement the spelling error detection methods, steps, and functions disclosed herein. For example, as shown in FIG. 2, the memory 230 stores one or more spelling error detection processes 260. Exemplary spelling error detection processes 260 are discussed further below in conjunction with FIGS. 3 and 4

The memory 230 could be distributed or local and the processor 220 could be distributed or singular The memory 230 could be implemented as an electrical, magnetic or optical memory, or any combination of these or other types of storage devices. It should be noted that each distributed processor that makes up processor 220 generally contains its own addressable memory space It should also be noted that some or all of system 200 can be incorporated into an application-specific or general-use integrated circuit. The computing device 200 optionally includes a display 240 The computing device 200 also optionally includes one or more network interfaces 250

Figure 3:
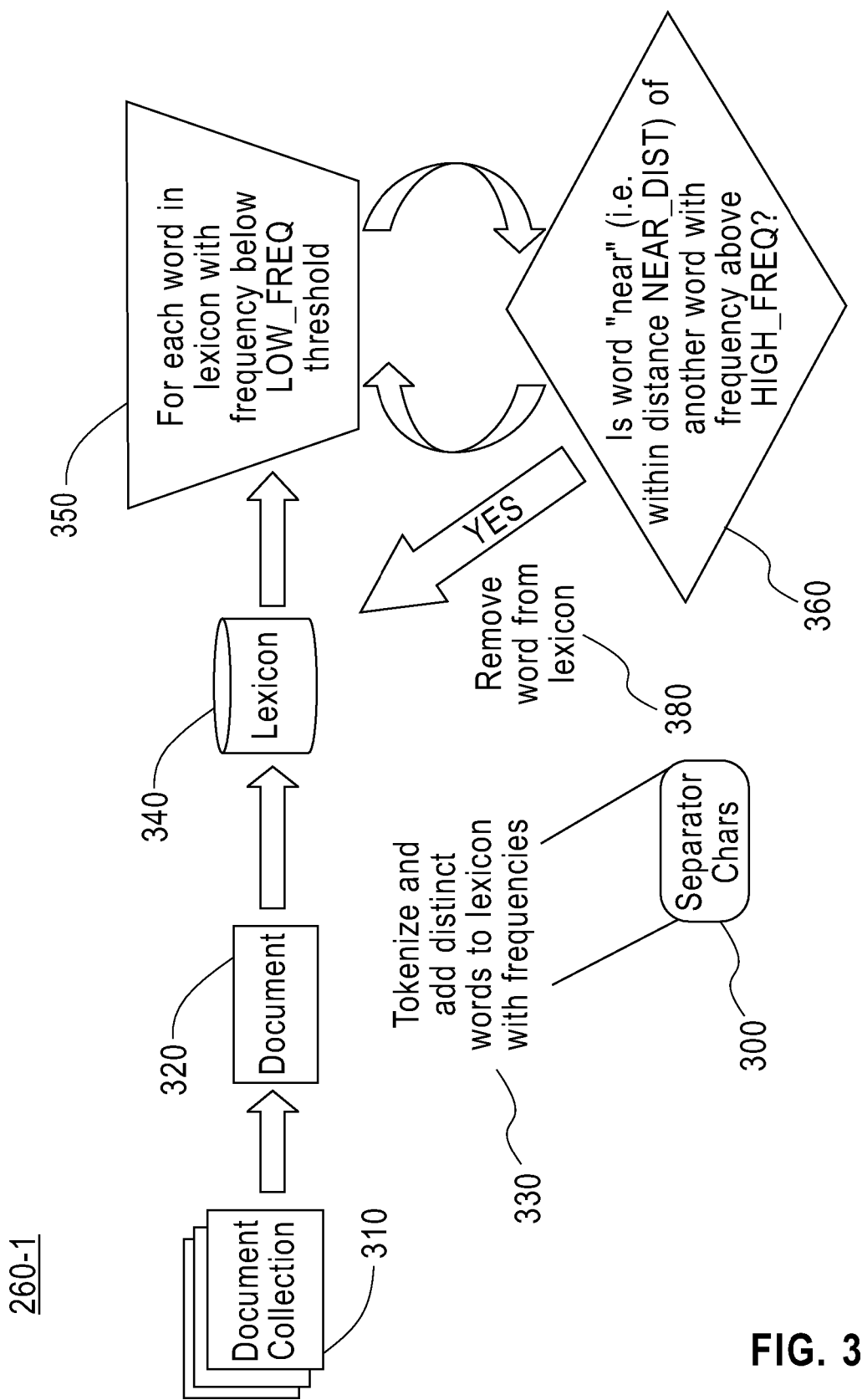
FIGS. 3 and 4 are flow charts describing exemplary implementations of a spelling error detection process incorporating features of the present invention.

FIG. 3 is a flow chart describing an exemplary implementation of a first embodiment of a spelling error detection process 260-1 incorporating features of the present invention. As shown in FIG. 3, the spelling error detection process 260-1 initially obtains or compiles a list of valid word separator characters during step 300 Thereafter, the collection of one or more documents 310 are processed during step 320, for example, one document at a time.

During step 330, the current document is broken up into tokens, for example, using word-separator based tokenization (or some other tokenization scheme) A lexicon 340 is compiled containing a list of all of the identified non-separator tokens (i.e., words appearing in all documents, together with their frequencies of appearance)

During step 350, all words that appear with a specified "low enough frequency," (i.e., a frequency below the user specified parameter LOW_FREQ) are identified Thereafter, during step 360, for all low frequency words identified in step 350, all words within a specified distance NEAR_DIST (a parameter that can be, for example, a function of the length of the candidate word) are identified A test is performed to determine if any such words have a frequency above a specified parameter HIGH_FREQ The frequencies LOW_FREQ and HIGH_FREQ may be measured as a raw word count of the number of times the word appears across all documents 310, or may be measured in some more sophisticated way (e.g., incorporating any existing "term frequency times inverse document frequency" measures, as would be apparent to a person of ordinary skill in the art).

If it is determined during step 360 that there is a commonly occurring word (e g, a word with frequency above HIGH_FREQ) within NEAR_DIST, the candidate word is marked as a potential misspelling and optionally removed from the lexicon of correctly spelled words during step 380

In addition, if there is a training period, where the lexicon is able to observe the correction patterns of actual users in conjunction with a spelling corrector that suggests misspellings, these candidate misspellings may be held in reserve, and as users either accept or reject the misspelling suggestions made by the corrector, the words are alternatively either kept apart from the lexicon or added back into it.

Figure 4:
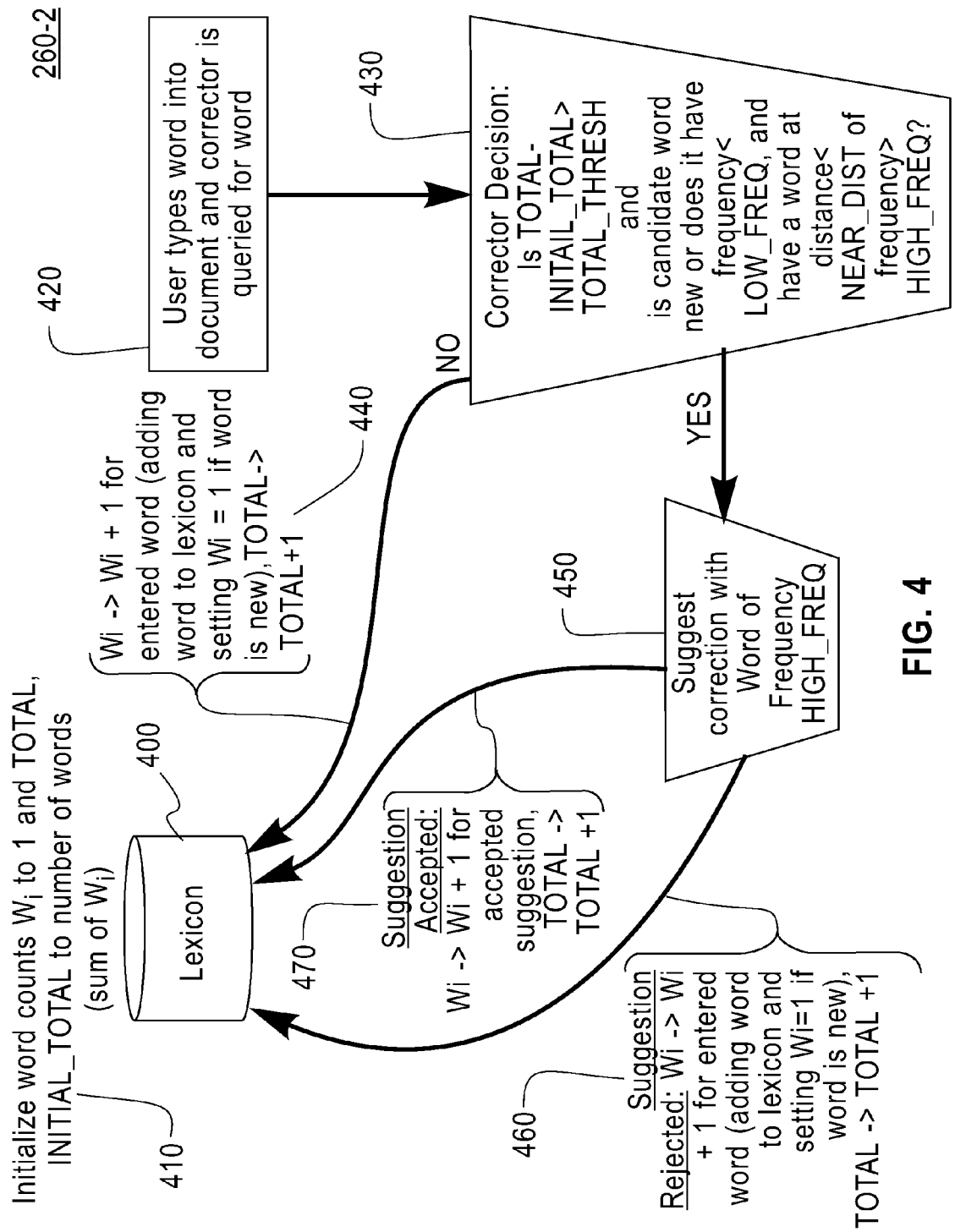

FIG. 4 is a flow chart describing an exemplary implementation of a second embodiment of a spelling error detection process 260-2 incorporating features of the present invention. Generally, the spelling error detection process 260-2 does not rely on frequencies in the lexicon, but instead uses the misspelling habits of one or more users to obtain an appropriate lexicon. The lexicon is equipped with a set of counters as described in the following steps and depicted in FIG. 4

As shown in FIG. 4, the spelling error detection process 260-2 initially starts with either (a) a collection of all (non-punctuation) tokens appealing in all documents in a corpus, or (b) a reference lexicon (possibly empty) during step 400 Refer to the words as 1, ... , n Refer to a generic word by the letter i. During step 410, a use count, per wold, $W_i$, is added to the lexicon 400, initialized to 1. Also a single count TOTAL is initialized to the total number of words (sum of $W_i$) and a count INITIAL_TOTAL, is initialized to the TOTAL value.

Each time the user types a word into an application during step 420 and the spelling corrector queries the lexicon during step 430, and does not suggest a correction, the word's lexicon count is incremented ($W_i \rightarrow W_i+1$) during step 440, along with the total count (TOTAL→TOTAL+1).

The count TOTAL-INITIAL_TOTAL is an indication of how much is known about the user's preferences. In the exemplary embodiment, when the count TOTAL-INITIAL_TOTAL is small, no legitimate word is flagged as a misspelling, e g, even if a word's count is 1 and the word is adjacent to (i.e., within edit distance tolerance of) another word with a count of 10 As the total count rises, so does the significance of count differentials between adjacent words When the difference TOTAL-INITIAL_TOTAL exceeds a specified threshold, TOTAL_THRESH, (which may be a function of the initial number of words or other parameters), it becomes significant enough for the small-count word to be given a correction suggestion during step 450.

At this point, the spelling error detection process 260-2 is similar to the embodiment discussed above in conjunction with FIG. 3. The small-count word must have a threshold beneath some LOW_THRESH, but where LOW_THRESH is a fraction of TOTAL_THRESH, and the high-count word must have a threshold above HIGH_THRESH, where HIGH_THRESH is similarly a fraction of TOTAL_THRESH All three of these values can be user controlled parameters As in the embodiment of FIG. 3, there is the additional parameter NEAR_DIST that determines when a candidate small-count word is near enough to a high-count word to warrant a correction suggestion. In general, the value of LOW_THRESH may be represented as a function of the total word count, the word count of the candidate word, the word count of the largest adjacent word and various user parameters. One exemplary formula for determining when to suggest corrections can be expressed as follows:

(total*avg(|adjacent count difference|))>1000

When a word has no match in the lexicon and a spelling correction is offered that is rejected, the potentially incorrect word is added to the lexicon with a count of 1 during step 470 or alternatively, when a known word's correction suggestion is not accepted, the counter $W_i$ for the known word is incremented, and in either case, the TOTAL counter is also incremented during step 460.

In the embodiment of FIG. 4, the fact that all counters are incremented by one at each step is not a consequential detail of the invention or embodiment It is equally plausible to say, increment the counter $W_i$ for a word by some larger amount when a word thought to be misspelled has its spelling correction suggestion rejected The idea in this case is that the act of rejecting a spelling correction is a strong statement by the user that the word is in fact valid and so the "vote" should count for more than unity.

In a further variation, the techniques described herein employ a reference dictionary (i e, a lexicon) of words that are believed to be correct, such as a set of "certified" correct words, that may appear infrequently in documents (or not at all) but be edit distance-wise close to other words. An example of such a word is reflux, a rather infrequently occurring word that is close to reflex. Thus, if a reference lexicon is available, it should be built upon and one need not start from scratch, or use just a collection of documents. Words found in the collection of documents would add to the existing lexicon.

While FIGS. 3 and 4 show an exemplary sequence of steps, it is also an embodiment of the present invention that the sequence may be varied. Various permutations of the algorithm are contemplated as alternate embodiments of the invention System and Article of Manufacture Details As is known in the art, the methods and apparatus discussed herein may be distributed as an article of manufacture that itself comprises a computer readable medium having computer readable code means embodied thereon The computer readable program code means is operable, in conjunction with a computer system, to carry out all or some of the steps to perform the methods or create the apparatuses discussed herein The computer readable medium may be a recordable medium (e.g., floppy disks, hard drives, compact disks, or memory cards) or may be a transmission medium (e g., a network comprising fiber-optics, the world-wide web, cables, or a wireless channel using time-division multiple access, code-division multiple access, or other radio-frequency channel). Any medium known or developed that can store information suitable for use with a computer system may be used The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for detecting a spelling error in one or more documents, comprising:

obtaining a maximum edit distance at which a word, w, is to be considered a possible misspelling of another word, w';

determining if at least one given word in said one or more documents satisfies a predefined misspelling criteria, wherein said predefined misspelling criteria comprises said at least one given word having a frequency below a predefined low threshold and said at least one given word being within the obtained maximum edit distance of one or more other words in said one or more documents having a frequency above a predefined high threshold;

identifying a given word as a potentially misspelled word if said given word satisfies said predefined misspelling criteria; and maintaining a lexicon such that said lexicon will include said given word if said given word does not satisfy said predefined misspelling criteria and will exclude said given word if said given word satisfies said predefined misspelling criteria, wherein one or more of said steps are performed by a processor.

2. The method of claim 1, further comprising the steps of adding all words in said one or more documents to a lexicon, determining a frequency of occurrence of each of said words in said one or more documents and removing said potentially misspelled word from said lexicon.

3. The method of claim 1, further comprising the steps of adding all words in said one or more documents to a lexicon, determining a frequency of occurrence of each of said words in said one or more documents and marking said potentially misspelled word within said lexicon in a manner that indicates that the word may be misspelled.

4. The method of claim 1, further comprising the step of presenting said potentially misspelled word to a user for validation.

5. The method of claim 1, wherein said one or more documents comprise documents being processed by at least one user, and wherein said method further comprises the step of maintaining a word count for each word in said one or more documents and wherein said word frequencies in said predefined misspelling criteria are based on said word counts.

6. The method of claim 5, further comprising the step of suggesting a correction of said at least one given word using said word within said predefined edit distance and having a frequency above said predefined high threshold.

7. The method of claim 6, further comprising the step of maintaining a count of the total words in said one or more documents and suggesting said correction only if said total word count satisfies a predefined criteria.

8. The method of claim 1, wherein said edit distance comprises determining a distance N that said at least one given word is from a second word, whereby said at least one given word can be transformed into the second word via a sequence of N steps of one or more of transposing adjacent characters, deleting a character, inserting a character, and replacing a character with another character.

9. The method of claim 1, wherein said predefined low threshold and said predefined high threshold are specified by a user.

10. The method of claim 1, wherein said at least one given word comprises one or more words or phrases.

11. The method of claim 1, further comprising the step of employing a reference lexicon of valid words and wherein said step of identifying a given word as a potentially misspelled word does not identify a given word as a potentially misspelled word if said given word appears in said reference lexicon.

12. The method of claim 1, wherein said maximum edit distance is a function of a length of the at least one given word.

13. A system for detecting a spelling error in one or more documents, said system comprising:

a memory; and at least one processor, coupled to the memory, operative to:

obtain a maximum edit distance at which a word, w, is to be considered a possible misspelling of another word, w';

determine if at least one given word in said one or more documents satisfies a predefined misspelling criteria, wherein said predefined misspelling criteria comprises said at least one given word having a frequency below a predefined low threshold and said at least one given word being within the obtained maximum edit distance of one or more other words in said one or more documents having a frequency above a predefined high threshold;

identify a given word as a potentially misspelled word if said given word satisfies said predefined misspelling criteria; and maintain a lexicon such that said lexicon will include said given word if said given word does not satisfy said predefined misspelling criteria and will exclude said given word if said given word satisfies said predefined misspelling criteria.

14. The system of claim 13, wherein said processor is further configured to add all words in said one or more documents to a lexicon, determine a frequency of occurrence of each of said words in said one or more documents and remove said potentially misspelled word from said lexicon.

15. The system of claim 13, wherein said processor is further configured to add all words in said one or more documents to a lexicon, determine a frequency of occurrence of each of said words in said one or more documents and mark said potentially misspelled word within said lexicon in a manner that indicates that the word may be misspelled.

16. The system of claim 13, wherein said processor is further configured to present said potentially misspelled word to a user for validation.

17. The system of claim 13, wherein said one or more documents comprise documents being processed by at least one user, and wherein said processor is further configured to maintain a word count for each word in said one or more documents and wherein said word frequencies in said predefined misspelling criteria are based on said word counts.

18. The system of claim 17, wherein said processor is further configured to suggest a correction of said at least one given word using said word within said predefined edit distance and having a frequency above said predefined high threshold.

19. The system of claim 18, wherein said processor is further configured to maintain a count of the total words in said one or more documents and suggesting said correction only if said total word count satisfies a predefined criteria.

20. The system of claim 13, wherein said at least one given word comprises one or more words or phrases.

21. The system of claim 13, wherein said at least one given word comprises one or more nucleotide sequences.

22. The system of claim 13, wherein said processor is further configured to employ a reference lexicon of valid words and wherein said step of identifying a given word as a potentially misspelled word does not identify a given word as a potentially misspelled word if said given word appears in said reference lexicon.

23. The system of claim 13, wherein said maximum edit distance is a function of a length of the at least one given word.

24. An article of manufacture for detecting a spelling error in one or more documents, comprising a tangible machine readable recordable medium containing one or more programs which when executed implement the steps of:

obtaining a maximum edit distance at which a word, w, is to be considered a possible misspelling of another word, w';

determining if at least one given word in said one or more documents satisfies a predefined misspelling criteria, wherein said predefined misspelling criteria comprises said at least one given word having a frequency below a predefined low threshold and said at least one given word being within the obtained maximum edit distance of one or more other words in said one or more documents having a frequency above a predefined high threshold;

identifying a given word as a potentially misspelled word if said given word satisfies said predefined misspelling criteria;

maintaining a lexicon such that said lexicon will include said given word if said given word does not satisfy said predefined misspelling criteria and will exclude said given word if said given word satisfies said predefined misspelling criteria.

25. The article of manufacture of claim 24, wherein said maximum edit distance is a function of a length of the at least one given word.

* * * * *